March 6, 1928.
H. FLETCHER
1,661,751
ACOUSTICAL APPARATUS
Filed Nov. 26, 1924
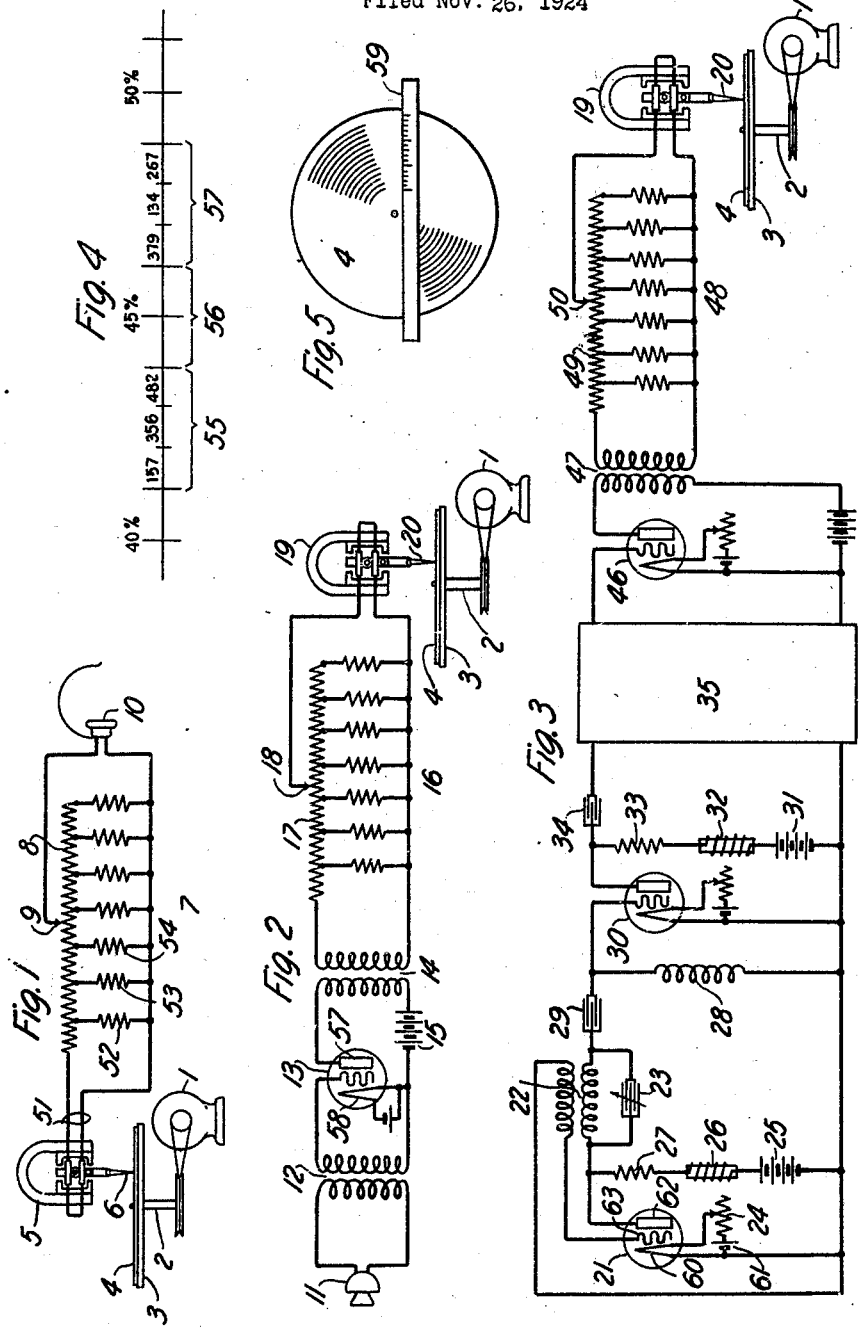
Inventor:
Harvey Fletcher
by E. W. Adams Atty Patented Mar. 6, 1928.

1,661,751

UNITED STATES PATENT OFFICE.

HARVEY FLETCHER, OF NEW YORK, N. Y., ASSIGNOR TO WESTERN ELECTRIC COMPANY, INCORPORATED, OF NEW YORK, N. Y., A CORPORATION OF NEW YORK.

ACOUSTICAL APPARATUS.

Application filed November 26, 1924. Serial No. 752,323.

This invention relates to acoustical apparatus, and more especially to sound recording and reproducing devices by means of which the characteristics of sound may be varied and predetermined at will.

For the purpose of testing the audibility of persons, such as hospital patients, school children and others, audiometers have been devised to produce sounds in a translating device, as a telephone receiver, which may be accurately predetermined with respect to both intensity and pitch. In most cases, however, these audiometers have employed apparatus more or less expensive for creating current oscillations in an electrical circuit which may be translated into sound vibrations of corresponding frequencies. These sounds, accordingly, are of an even or musical character and while their intensity and pitch may be regulated with a high degree of accuracy, they represent only a portion of the different types of sounds to which the human ear is accustomed. In performing tests of audibility, it may be desirable to ascertain the ability of the subject to hear speech sounds. This may be especially true of school children. Moreover, it is particularly desirable in the case of schools where a large number of subjects are tested in a limited period of time, to employ a device which can be manipulated in a simple and expeditious manner without the requirement of a skilled operator.

Accordingly, one object of this invention is to improve acoustic devices of this type by producing an audiometer which is characterized by simplicity, accuracy and reliability both in its construction and operation.

A feature of the invention relates to an acoustic device in which a phonographic record is used for performing an accurate test of audibility.

Another feature of the invention relates to a sound producing device in which a phonographic record, having recorded thereon sounds of a desired character, is so employed that the recorded sounds are translated into electric currents which are then controlled to predetermined values and then translated into sounds.

Another feature relates to an audiometer in which a phonographic record, having recorded thereon sounds of predetermined and variable pitches, is so employed that said sounds are translated into electric currents and then again translated into sounds.

Another object of the invention is an improved article of manufacture which consists of a phonographic recording medium having attenuated sounds recorded thereon, the degree or rate of attenuation being accurately predetermined.

Another object of the invention is an improved method of producing an attenuated phonographic record.

A further object of the invention is an improved article of manufacture which consists of a phonographic recording medium having a series of sounds recorded thereon, said sounds having varying and accurately predetermined pitches.

Another object of the invention is an improved method of producing a phonographic record having sounds recorded thereon of varying and predetermined pitches.

Referring to the drawing, Fig. 1 shows one type of audiometer embodying the principles of this invention.

Fig. 2 shows the circuits and apparatus suitable for carrying out the method of producing attenuated phonographic records.

Fig. 3 shows the circuits and apparatus suitable for practicing the method of producing phonographic records of varying and predetermined sound pitches.

Fig. 4 is a graphic representation of a sound record recorded upon a phonographic recording medium for use in the audiometer.

Fig. 5 illustrates a phonographic recording medium and shows associated therewith a frequency or pitch indicating scale.

The audiometer in which the principles of this invention are embodied, consists primarily of a driving motor, a phonographic turn table, a phonographic record, an electro-magnetic reproducer, a potentiometer or attenuator, and a translating device such as a telephone receiver. This equipment may be compactly and suitably arranged in a small portable cabinet or case which lends itself readily to the convenience of performing the required audibility tests.

Referring to Fig. 1 particularly, there is shown a small driving motor 1 coupled to a shaft 2 which rotates a phonographic turn table 3. A recording disc 4, which carries the record of the sounds by means of which the audibility tests are made, is supported on the turn table 3 and rotates therewith under the power of the driving motor 1. Cooperating with the recording disc 4 is a reproducer 5 which serves to translate the record of the sound in the phonographic recording disc into electrical currents which are caused to flow in the circuit 51. The translating device 5 may be of any suitable type such as an electromagnetic reproducer having a stylus 6 which follows the hills and valleys or other irregularities in the record groove and causes corresponding displacements of the armature element in the magnetic field. These displacements create a flow of current in the circuit 51 which is a true translation of the sound recorded in the disc 4.

For an understanding of the details of an electro-magnetic reproducer, reference is made to a copending application of Henry C. Harrison, Serial No. 668,801, filed October 16, 1923.

The electric currents in the circuit 51 are delivered to a potentiometer or attenuator 7, the function of which is to vary the intensity thereof by increments to a high degree of accuracy and precision. The attenuator consists primarily of a series resistance 8 together with a plurality of shunt resistances 52, 53, 54, etc., and an adjustable contact 9 which may be shifed from one point to another along the resistance 8 to both vary the portion of said resistance 8 which is effective and also to vary the number of shunt resistances effective. This instrument may be provided with a scale which may be calibrated to read in units of any desired character. For example, the scale may be designed to read in transmission units, or it may preferably be calibrated to read in percentages of audibility. The scale, of course, carries an index pointer which is coupled with the slidable contact 9.

For a more comprehensive understanding of an attenuator of this type, reference is made to Patent No. 1,613,423 of January 4, 1927 to Raymond L. Wegel.

The electric currents after having their intensity attenuated by the potentiometer 7 are then delivered to the telephone receiver 10 which translates them into sound energy having an intensity commensurate with the intensity of the current before translation. These sounds are then impinged upon the ear of the subject undergoing the test, and his ability to distinguish them until the attenuation has reached a point where the sounds passed beyond the threshold of audibility determines the subject's percentage of hearing.

Considering now the phonographic record employed with the audiometer shown in Fig. 1, this may consist of a series of sounds of any desired character recorded on a disc or cylinder of the usual phonographic recording material. For convenience of illustration, a disc 4 is shown in the drawing. It also has been found that an efficient test may be had by employing series of numbers each comprising a uniform number of digits, as for example three digits, and preferably arranged in groups, as for instance three numbers per group. The sounds representing these numbers are produced by a person capable of maintaining a substantially uniform intensity and quality.

Referring to the diagram in Fig. 4, a better idea may be had of the manner in which the sounds are recorded on the record. The first group shown, viz, group 55, consists of three numbers which may be made up of digits selected arbitrarily. Following the record of the sounds representing the first group 55, there occurs a space 56 in the record groove which is blank except for the announcement of the percentage of hearing at which the subject is to be tested by the succeeding group of numbers. Then comes the succeeding group 57 which is similarly made up of three separate members, each having three digits selected at random. Following this group, occurs the next interval in which the announcement is made of the next percentage of hearing at which the subject is to be tested by the succeeding group of numbers. In a similar manner, other groups are recorded, each being preceded by a record of the announcement of the percentage of hearing. These percentages of hearing may be graduated in any suitable manner so as to cover any desired portion of the audible range up to the threshold.

If the sounds are recorded in a substantially uniform intensity in the recording disc 4, when they are translated into currents in the circuit 51, these currents will likewise be of substantially uniform and corresponding intensity. Therefore, the operator by adjusting the attenuator 7 may regulate these currents so that when again translated by the receiver 10, the resulting sounds will have an intensity corresponding to that required for testing any desired percentage of audibility.

In order to make it possible to dispense with the use of the attenuator 7 while the tests are being made, a record has been produced in which the successive sounds are attenuated at the time of recording. By accurately predetermining the intensity of the sounds and by increasing or decreasing the intensity of successive sounds at the time the record is made, the attenuator 7 may be eliminated entirely when the record is subsequently used for the audibility tests. As a method of producing an attenuated record, the equipment shown in Fig. 2 is provided and consists primarily of a high quality microphone or transmitter 11, an amplifier 13, a potentiometer or attenuator 16, and an electromagnetic recorder 19. The process consists in translating sound energy into electrical currents, attenuating said currents and retranslating the attenuated currents into a permanent sound record.

This may be accomplished by impinging sounds of substantially uniform intensity upon the diaphragm of the microphone 11. These sounds are thereby translated into electrical currents which flow into the primary circuit of the transformer 12, thereby inducing corresponding potential variations in the secondary winding of the transformer 12. The electrical variations induced in the secondary winding of the transformer are delivered to the input circuit of the amplifier 13, which may be of the well-known thermionic type, such as a vacuum tube. The output circuit of the amplifier 13 is connected to the plate 57 and filament 58 and includes the space current supply source 15 and the primary winding of the transformer 14. The amplified current flowing in the primary winding of the transformer causes the induction of the electromotive forces in the secondary winding of the transformer, which again causes the flow of current in the input circuit of the potentiometer 16. The amplified currents thus delivered to the potentiometer 16 are a true representation of the sound waves impinged upon the diaphragm of the transmitter 11.

With the attenuator set for a given percentage of hearing, the currents delivered to said attenuator are attenuated to the value corresponding to such percentage of hearing and then delivered to the electromagnetic recorder 19. The stylus 20 of the recorder is varied in accordance with the currents received, and a groove in the record plate 4, which is being rotated by the motor 1, is cut by such stylus to give a record of a sound which will have the intensity necessary to test the audibility of a subject at the particular percentage of hearing for which the attenuator 16 is set. Similarly, for other percentages, the attenuator 16 may be set accordingly and the sounds recorded on the recording disc 4. The recorder 19 may be of substantially the same type as the reproducer 5, or may be of any other suitable type.

It has also been found desirable in making an audibility test to observe the subject's ability to hear sounds at different pitches. To this end, there has been produced a phonographic record for use in the audiometer upon which there are recorded a series of continuous or musical sounds each having a different and predetermined pitch. The record 4, when prepared in this manner, would have, for example, a number of grooves devoted to a sound having a given pitch, followed by a number of grooves devoted to a sound of higher pitch followed by a number of grooves devoted to a sound of still higher pitch, and so on, until as much of the range of pitches has been covered as desired. In order to enable the operator to determine the pitch of the sound that the subject is receiving at any given instant, a scale 59 is attached to the machine above the turn table, so that the record 4 rotates thereunder and in close proximity thereto. This scale may contain a range of the pitches and shows the particular pitch of the sound in the groove traced by the stylus at any time in the travel of the stylus across the face of the record.

For carrying out the method of producing phonographic records having sounds of different pitches, an apparatus, such as shown in Fig. 3, may be employed. This process consists primarily in generating an oscillatory current at different frequencies, and translating said current at any desired frequency into a permanent sound record. For this purpose, there is provided in the apparatus of Fig. 3, an oscillator or harmonic generator comprising a thermionic valve 21 of the well-known type, a source of space current 25, an inductance 26, a resistance 27, a variable condenser 23, and a transformer 22. The filament 60 of the oscillator 21 is heated by a source of current 61, the intensity of which may be regulated by the rheostat 24. The output circuit of the oscillator 21 includes the filament 60, plate 62, the primary winding of the transformer 22, the condenser 23, condenser 29, and the reactance coil 28. The bridge across the output circuit including the battery 25, reactance coil 26, and resistance 27, permits the flow of the direct space current but prohibits the passage of the high frequency oscillations. The secondary winding of the transformer 22 is connected to the filament 60 and the grid 63 of the oscillator 21 constituting the input circuit thereof. This feed-back connection causes, in the well-known manner, the presence of a sustained oscillatory current in the output circuit of the oscillator 21. By adjusting the condenser 23 and by selecting appropriate values for the windings of the transformer 22, the oscillator may be caused to oscillate at any desired frequency. The oscillator may also be arranged to produce the usual harmonic frequencies containing the base frequencies.

The output circuit of the oscillator 21 is connected to the input circuit of the amplifier 30, which also comprises a thermionic valve of the well-known type. The space current for the amplifier 30 is provided by the source 31, which is connected through the inductance 32 and resistance 33 across the filament and plate electrodes of said amplifier.

The output circuit of the amplifier 30 includes the condenser 34 and a filter 35. The filter 35 may be of any well-known construction and arranged to be adjustable to pass any desired frequency or band of frequencies to the input side of the amplifier 46.

The currents of the desired frequency are amplified by the amplifier 46 and corresponding currents induced in the secondary winding of the transformer 47, which are delivered to the input circuit of an attenuator 48. In the event that no attenuation is desired, the contact 50 may be moved to the extreme left of the series resistance 49. The currents in the secondary winding of the transformer 47 are thus delivered directly to an electromagnetic recorder 19 which actuates the stylus 20 to cut the groove in the rotating phonographic record 4. In this manner, the groove cut in the record 4 is a correct sound representation of an oscillating current of a determined frequency. Thus the recorded sound will, when reproduced, have a pitch equal to the frequency of the oscillating current. In this manner, by manipulating the network 35, and by adjusting the elements in the oscillation circuit, currents of any desired frequency may be delivered to the recorder 19, which translates these currents into a sound record of corresponding frequencies. In this manner, the phonographic record 4 is prepared which, when employed in connection with the other elements shown in Fig. 1, will produce sounds of predetermined frequencies in the translating device 10.

If desirable, the intensity of the tones of different frequencies may be regulated by the attenuator 48 while the record is being prepared.

For a more thorough understanding of the manner in which the oscillator and amplifiers are operated, reference is made to Patent 1,530,498 of March 24, 1925 to B. W. Kendall.

While certain types of apparatus have been disclosed for the purpose of carrying out this invention, it is to be understood that the invention does not depend upon any particular form of device and that other equivalent mechanisms may be used if desired.

What is claimed is:

1. The combination of a phonographic record having recorded thereon a series of separate sounds of substantially uniform intensity, means for translating said sound record into electric currents, means for regulating each current to a definite value which differs from the preceding current by an accurately predetermined amount, and means for translating said regulated currents into sounds of corresponding intensities.

2. A combination of a phonographic record having recorded thereon at regularly spaced intervals a series of sounds of substantially uniform intensity, means for translating the record of said sounds into electric currents, means for regulating each current to a definite value which differs from the preceding current by an accurately predetermined amount, and means for translating said regulated currents into sounds of corresponding intensities.

3. The combination of a phonographic record having recorded thereon a series of separate sounds of substantially uniform intensity, means for translating the record of said sounds into electric currents, means for attenuating the intensity of each current to a definite value which is less than the intensity of the preceding current by an accurately predetermined amount, and means for translating said attenuated current into sounds of corresponding intensities.

4. The combination with a phonographic record having recorded thereon a series of separate sounds of substantially uniform intensity of means for translating said sound record into a series of electric currents of substantially uniform intensity, means for regulating each current to a definite value which differs from the preceding current by an accurately predetermined amount, and means for translating said regulated currents into sounds of corresponding intensities.

5. The combination with a phonographic record having recorded thereon a series of separate sounds of substantially uniform intensity, means for translating the record of said sounds into electric currents, means for regulating the intensities of said currents to different and definite values which correspond to sound intensities necessary to measure predetermined degrees of hearing, and means for translating said regulated currents into sound waves.

6. The combination with a phonographic record having recorded thereon a series of sounds of substantially uniform intensity of an electric circuit, means for translating said sounds into currents of said circuit, means for attenuating the intensity of each current to a definite value below the intensity of the preceding current which accurately corresponds to a sound intensity necessary to test audibility at a predetermined percentage, and means for translating said attenuated currents into sound waves.

7. A combination in an acoustic device of a phonographic record having recorded thereon a series of sounds of accurately predetermined intensities, means for translating said sounds into electric currents, a potentiometer comprising a series resistance and a plurality of shunt resistances for attenuating said electric currents by accurately predetermined increments, and means for translating said attenuated currents into sound energy.

8. A combination in an acoustic device of a phonographic record having a series of sounds recorded thereon, each sound having a definite predetermined pitch different from the pitches of the other sounds, means for translating the record of said sounds into electric currents, and means for translating said electric currents into sound energy at the different pitches.

9. The combination in an acoustic device of a phonographic record having recorded thereon a series of separate sounds, each sound attenuated in intensity by an accurately predetermined amount below the intensity of the preceding sound, means for translating the record of said sounds into electric currents, and means for translating said electric currents into sound energy at corresponding intensities.

10. The method of producing a phonographic record which consists in translating sound energy into electric currents, attenuating said currents by accurately predetermined increments, and then translating said attenuated currents into a permanent sound record.

11. The method of producing a phonographic record which consists in translating sound energy into electric currents, amplifying said currents, attenuating the intensities of the amplified currents to values which correspond to sound intensities necessary to test predetermined degrees of audibility, and then translating said attenuated currents into a permanent sound record.

12. The method of producing a phonographic record which consists in translating sounds into electric currents by impinging the sound waves upon a microphonic diaphragm, attenuating said currents by accurately determined amounts, and then translating said attenuated currents into a sound record by delivering said attenuated currents to an electromagnetic recording device.

13. The method of producing a phonographic record which consists in generating an oscillatory electric current of different frequencies, and translating said current at selected fequencies into a permanent sound record.

14. The method of producing a phonographic record which consists in generating oscillatory current, varying the frequency of said current by accurately determined increments, and then translating said current into a sound record at each frequency.

15. The method of producing a phonographic record which consists in generating oscillatory current having a plurality of frequencies, selecting any desired frequency by filtering the remaining frequencies, and translating the current at each desired frequency into a permanent sound record.

In witness whereof, I hereunto subscribe my name this 25th day of November, A. D. 1924.

HARVEY FLETCHER.